No. 878,323.
PATENTED FEB. 4, 1908.
A. WHITE.
HORSE RELEASER.
APPLICATION FILED JULY 7, 1906.
2 SHEETS—SHEET 1.
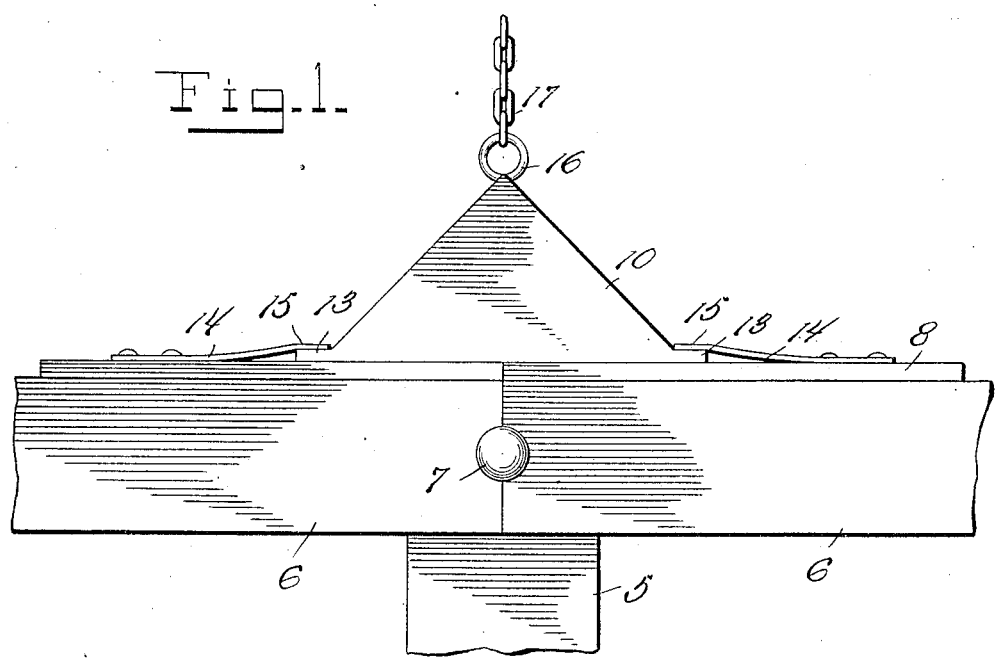
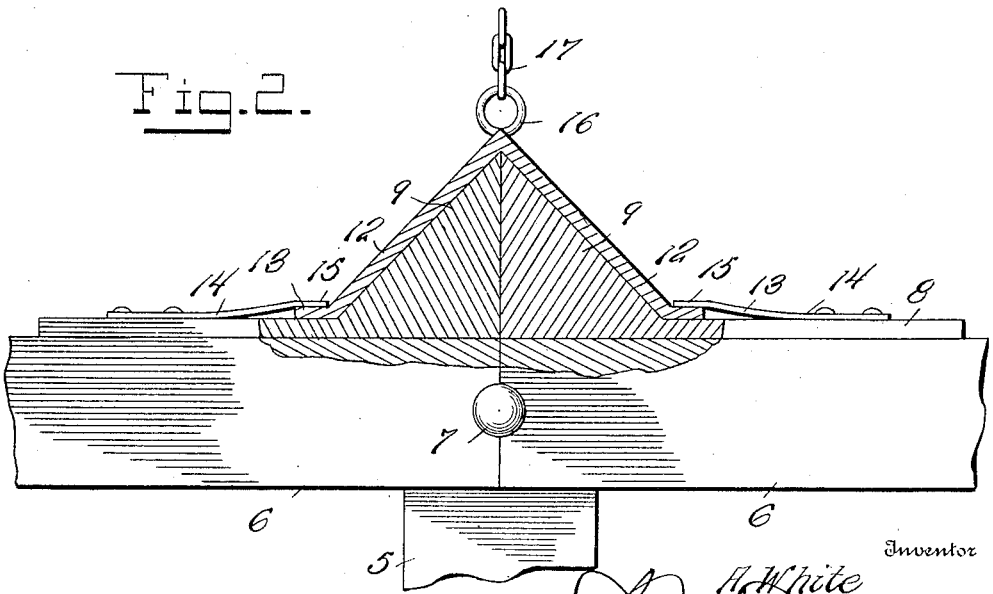
Witnesses
G. R. Thomas
F. G. Smith.
Inventor
A. White
By
Attorneys No. 878,323.
PATENTED FEB. 4, 1908.
A. WHITE.
HORSE RELEASER.
APPLICATION FILED JULY 7, 1906.
2 SHEETS—SHEET 2.
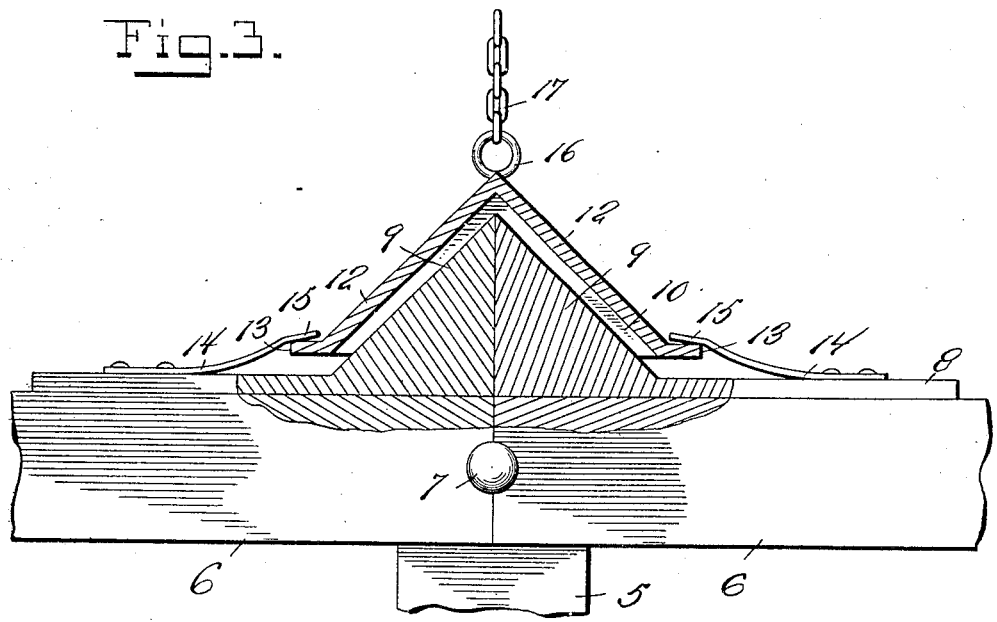
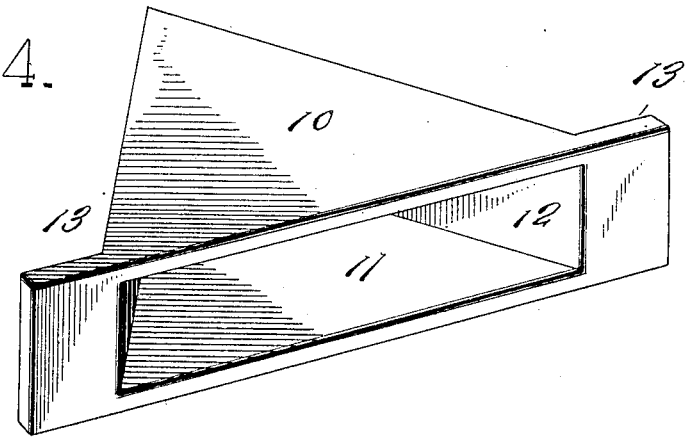

UNITED STATES PATENT OFFICE.

ALTON WHITE, OF RAYWOOD, TEXAS.

HORSE-RELEASER.

No. 878,323.   Specification of Letters Patent.   Patented Feb. 4, 1908.

Application filed July 7, 1906. Serial No. 325,137.

*To all whom it may concern:*

Be it known that I, ALTON WHITE, a citizen of the United States, residing at Raywood, in the county of Liberty, State of Texas, have invented certain new and useful Improvements in Horse-Releasers; and I do hereby declare the following to be a full, clear, and exact description of the invention, such as will enable others skilled in the art to which it appertains to make and use the same.

This invention relates to horse releasers and resides in the provision of a sectional double tree and means for disconnecting the sections to release the horse from the vehicle in connection with which the double tree is used.

The invention resides in forming upon plates, which are attached to the section of the double tree the sections of a head and in providing a cap for engagement over the head when the double tree is in set up position, to hold the said sections together, said cap being removably held in this position by means of leaf springs which are carried by the said plates.

In the accompanying drawings, Figure 1 is a top plan view of a double tree constructed in accordance with the present invention, Fig. 2 is a horizontal sectional view through the same showing the cap in position upon the sections forming the head, Fig. 3 is a similar view showing the cap partly removed, and, Fig. 4 is a detail perspective view of the cap.

Referring more specifically to the drawings the numeral 5 denotes the pole or tongue of a vehicle and 6 the sections forming the double tree, which sections have their meeting ends correspondingly recessed to receive the usual bolt 7 upon which the double tree swings.

Secured to the rear edge of each section 6 is a plate 8 the said plates being provided at their meeting ends with head sections 9 which when the double tree sections are in set up position, form a wedge shaped head. A cap is provided for engagement over the head thus formed and comprises top and bottom walls 10 and 11 respectively and side wall 12, the cap being of the same general shape as the head formed by the sections 9 and being opened at its major end. At the end of the side wall 12 and at the open end of the cap, there is formed a lug 13 which projects laterally from the said sides 12 and lie against the rear face of the corresponding plate 8.

Leaf springs 14 are secured at corresponding ends to the rear face of the plate 8 and have their free ends 15 opposing each other and bearing against the rear face of the corresponding lug 13 thereby serving to hold the cap member of the device normally in engagement upon the head formed by the head section 9.

It is obvious that the only force exerted upon the double tree sections 6 is not in a plane directly at right angles to the side walls to the cap member and that as long as the cap member is retained upon the head, the double tree sections will be held against separation and at the same time it will be readily seen that when the cap is pulled from engagement with the head, the double tree section will be allowed to separate thereby releasing the horses from the vehicle, the springs 14 being provided for the purpose of holding the cap upon the head as stated.

In order that the cap may be removed, the ring or eye 16 is formed at the apex thereof and to the said ring or eye is connected one end of a chain or couple 17 which leads into the vehicle at a convenient point.

It is to be understood that I do not desire to be limited to the exact details of construction shown and described, for obvious modifications will occur to a person skilled in the art.

What is claimed, is—

A device of the class described comprising a whiffle-tree separated at its middle transversely, the ends of the sections thus formed being provided with registering recesses for the reception of the pivot bolt for the tree, substantially triangular head sections secured upon the rear edges of the sections and extending rearwardly therefrom and combining to form a triangular head which is pointed rearwardly, a hollow triangular shaped cap loosely fitted over the head, said cap being provided at its forward corners with laterally extending flanges, leaf springs secured to the attaching portions of the head sections and extending toward each other and at their free ends overlapping the flanges upon the cap, and a flexible pull device connected with the apex of the cap.

In testimony whereof, I affix my signature, in presence of two witnesses.

ALTON WHITE.

Witnesses:
F. G. SMITH,
G. J. BURNS.